United States Patent
Misu et al.

(10) Patent No.: US 7,168,463 B2
(45) Date of Patent: Jan. 30, 2007

(54) METHOD OF CHARGING DYNAMIC-PRESSURE BEARING DEVICE WITH LUBRICATING FLUID, AND METHOD OF INSPECTING DYNAMIC-PRESSURE BEARING DEVICE

(75) Inventors: Isao Misu, Kyoto (JP); Masaaki Uchiyama, Kyoto (JP); Tatsuya Yoshida, Kyoto (JP)

(73) Assignee: Nidec Corporation, Kyoto (JP)

( * ) Notice: Subject to any disclaimer, the term of this patent is extended or adjusted under 35 U.S.C. 154(b) by 158 days.

(21) Appl. No.: 10/906,493

(22) Filed: Feb. 23, 2005

(65) Prior Publication Data

US 2005/0186101 A1    Aug. 25, 2005

(30) Foreign Application Priority Data

Feb. 23, 2004  (JP) ............................ 2004-047117

(51) Int. Cl.
*B65B 1/04* (2006.01)
(52) U.S. Cl. .................. 141/67; 141/4; 141/7
(58) Field of Classification Search .................. 141/1, 141/4, 7, 65, 59, 67; 184/1.5, 5.1
See application file for complete search history.

(56) References Cited

U.S. PATENT DOCUMENTS

| | | | |
|---|---|---|---|
| 5,067,528 A | 11/1991 | Titcomb et al. | |
| 5,575,355 A | 11/1996 | Williams et al. | |
| 5,601,125 A | 2/1997 | Parsoneault et al. | |
| 5,778,948 A | 7/1998 | Gomyo et al. | |
| 5,862,841 A | 1/1999 | Wuester, Sr. | |
| 5,894,868 A | 4/1999 | Wuester, Sr. | |
| 6,305,439 B1 | 10/2001 | Pool et al. | |
| 6,733,180 B2 | 5/2004 | Nakamura | |
| 7,028,721 B2* | 4/2006 | Bowdoin et al. | ............. 141/59 |
| 2002/0175577 A1 | 11/2002 | Yoshitsugu et al. | |
| 2003/0108257 A1 | 6/2003 | Gomyo | |
| 2004/0020721 A1 | 2/2004 | Iwamoto et al. | |
| 2004/0256178 A1 | 12/2004 | Neumann et al. | |

FOREIGN PATENT DOCUMENTS

| | | |
|---|---|---|
| JP | HO6-269142 A | 9/1994 |
| JP | HO8-270653 A | 10/1996 |
| JP | HO9-014256 A | 1/1997 |
| JP | HO9-303400 A | 11/1997 |
| JP | H10-271777 A | 10/1998 |
| JP | H10-322972 A | 12/1998 |
| JP | H11-141540 A | 5/1999 |

(Continued)

*Primary Examiner*—Steven O. Douglas
(74) *Attorney, Agent, or Firm*—James Judge

(57) ABSTRACT

Method of charging dynamic-pressure bearing device with lubricating fluid. Preparatorily, lubricating fluid is put into a vacuum chamber and the chamber is vacuum-evacuated to subject the lubricating fluid to a degassing process. An appropriate quantity of fluid is dispensed in one end of the bearing gap, with the bearing device having been placed in a reduced-pressure ambient. In carrying out the dispensation, the pressure of the ambient is adjusted so as to be higher than the pressure during the degassing process. The method in this way prevents the lubricating fluid from frothing when it is being dispensed, and makes it possible to charge dynamic-pressure bearing devices with lubricating fluid without soiling the bearing-device surfaces with splashes or other contaminants.

20 Claims, 10 Drawing Sheets

FOREIGN PATENT DOCUMENTS

| | | |
|---|---|---|
| JP | 2001-107966 A | 4/2001 |
| JP | 2001-107967 A | 4/2001 |
| JP | 2001-165153 A | 6/2001 |
| JP | 2002-005170 A | 1/2002 |
| JP | 2002-168394 A | 6/2002 |
| JP | 2002-174242 A | 6/2002 |
| JP | 2002-174243 A | 6/2002 |
| JP | 2002-213452 A | 7/2002 |
| JP | 2002-327748 A | 11/2002 |
| JP | 2003-130053 A | 5/2003 |
| JP | 2003-314791 A | 11/2003 |
| JP | 2004-003622 A | 1/2004 |
| JP | 2004-150605 A | 5/2004 |
| JP | 2004-278629 A | 10/2004 |
| JP | 2004-278630 A | 10/2004 |
| JP | 2004-278760 A | 10/2004 |
| JP | 2004-301328 A | 10/2004 |
| JP | 2004-301329 A | 10/2004 |

* cited by examiner

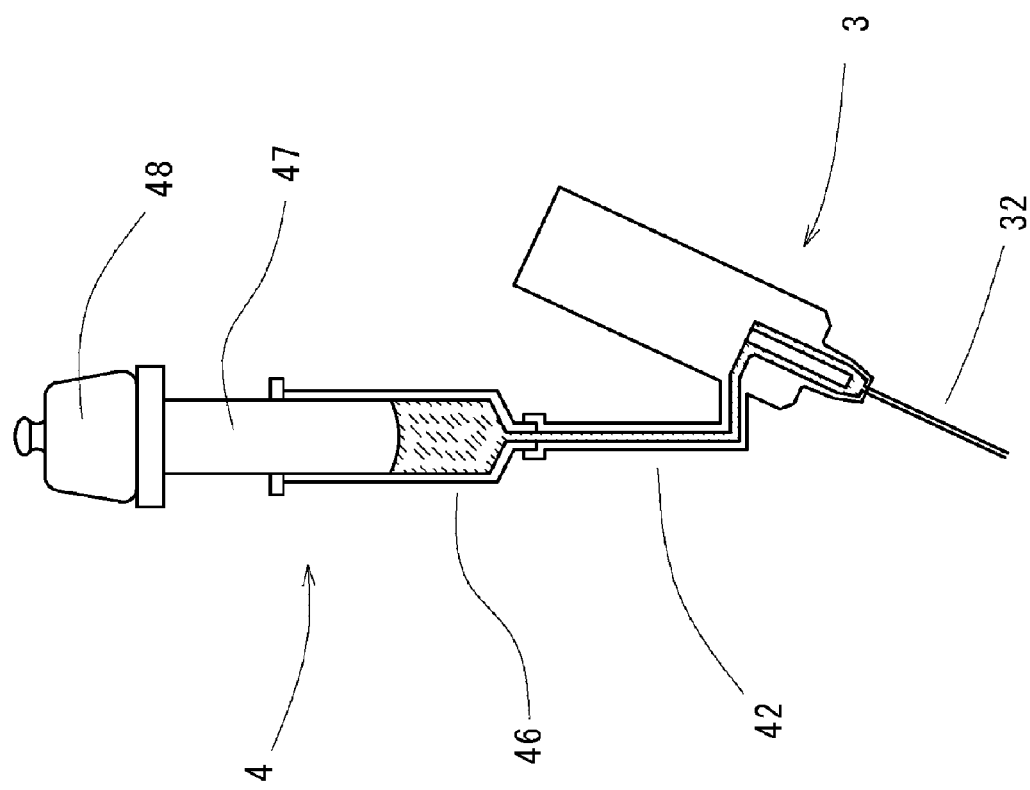
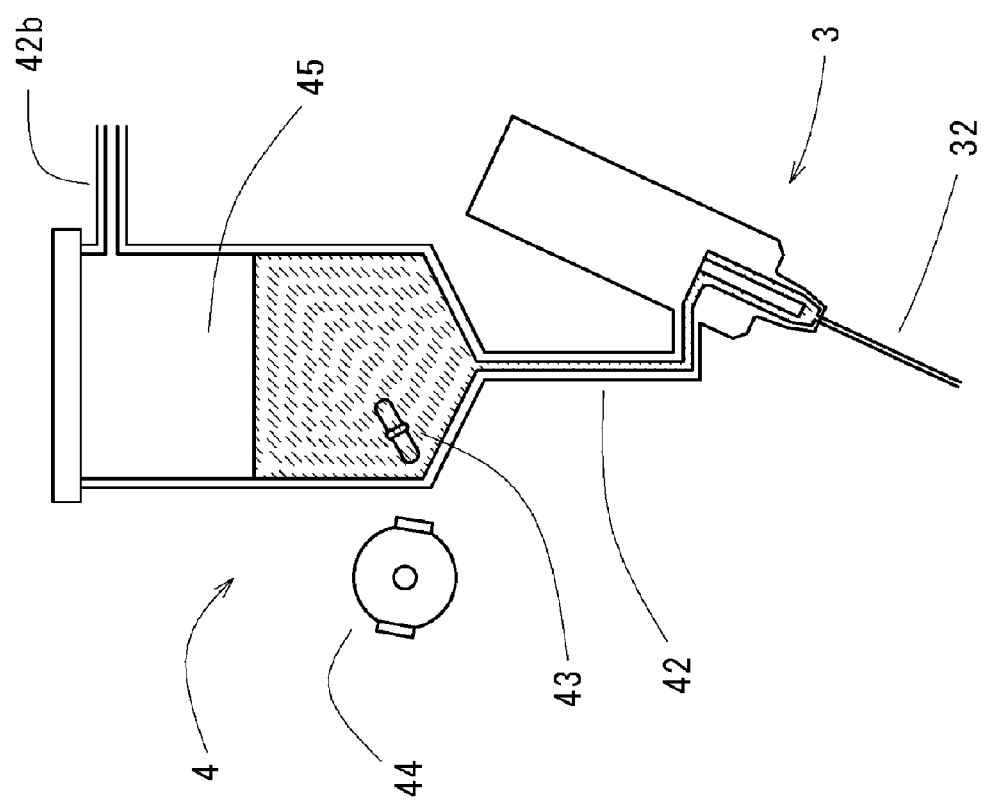
FIG. 2B
FIG. 2A

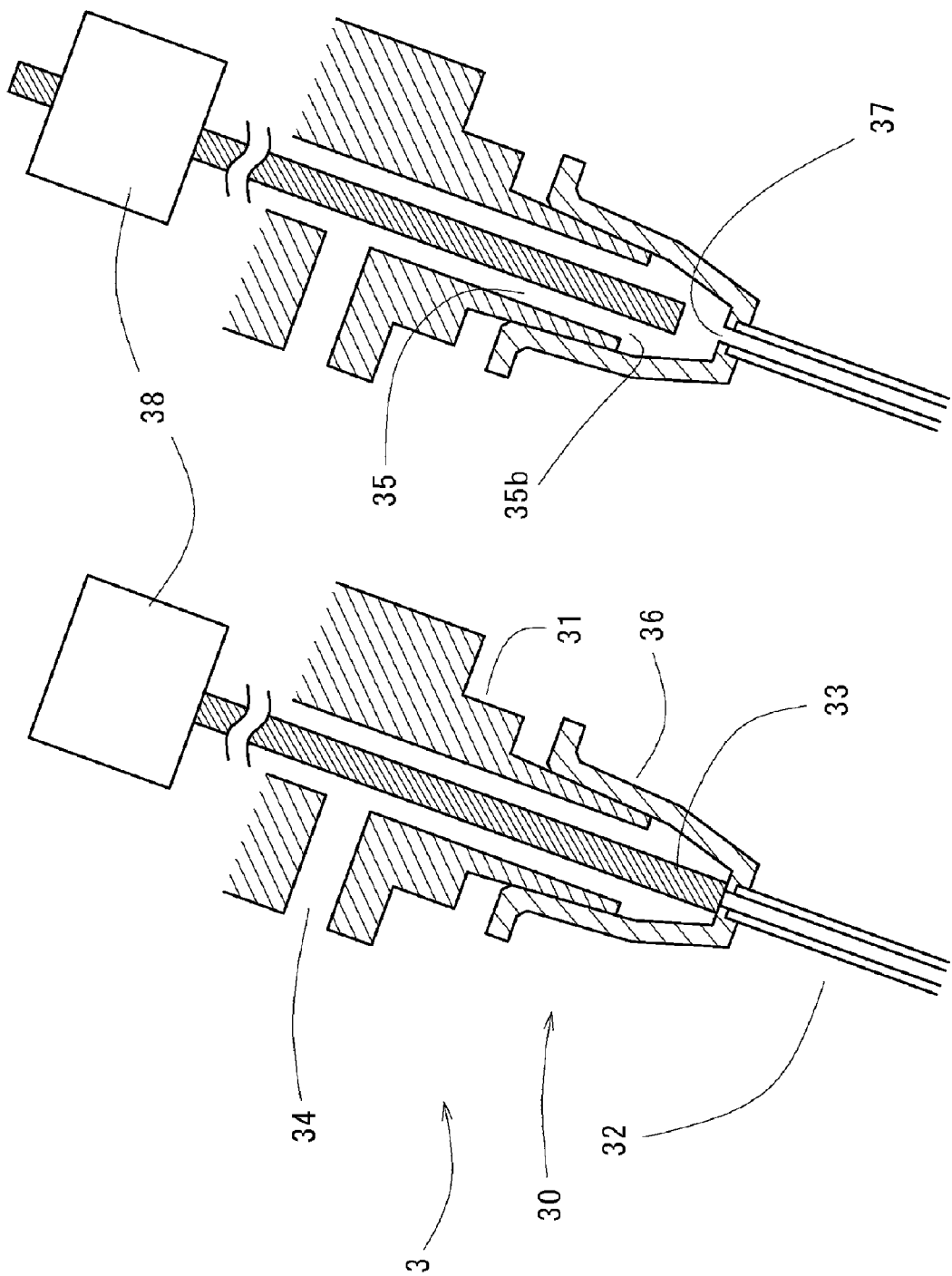

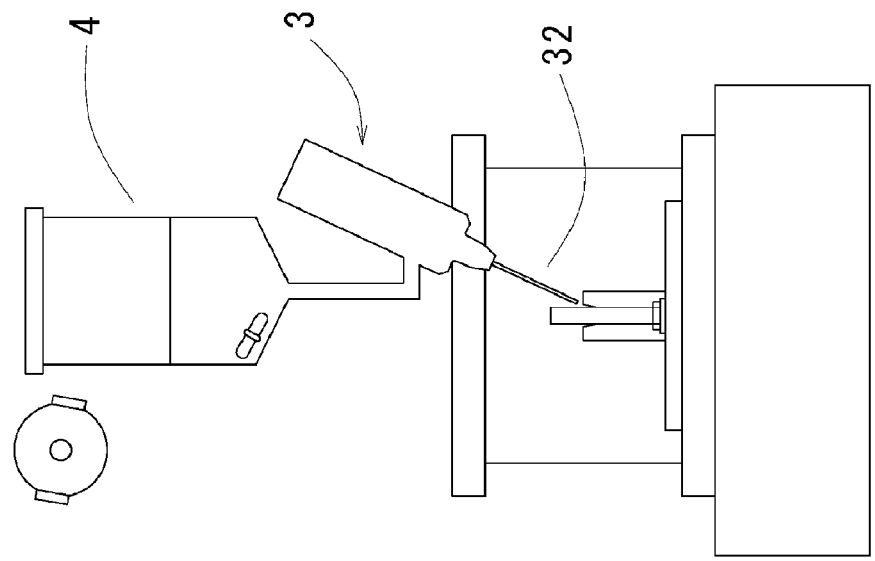
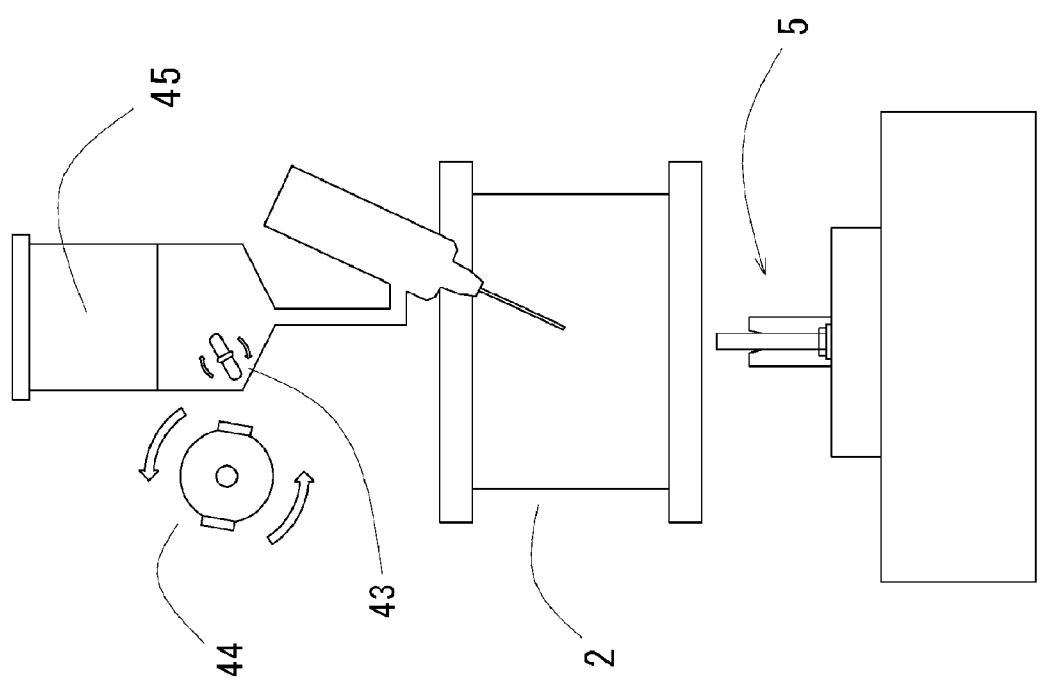
FIG. 4A
FIG. 4B

METHOD OF CHARGING DYNAMIC-PRESSURE BEARING DEVICE WITH LUBRICATING FLUID, AND METHOD OF INSPECTING DYNAMIC-PRESSURE BEARING DEVICE

BACKGROUND OF THE INVENTION

1. Technical Field

The present invention relates to methods of manufacturing, and to manufacturing apparatus for, dynamic-pressure bearing devices employed in signal record/playback devices such as hard-disk drives.

2. Description of the Related Art (1) Dynamic-Pressure Bearing Device Structures A variety of fluid dynamic-pressure bearings have to date been employed in spindle motors used in signal record/playback devices such as hard-disk drives. Fluid dynamic-pressure bearings provide journal support by producing fluid pressure in a lubricant, such as a lubricating fluid, interposed in between a shaft and sleeve.

Single examples of spindle motors that employ a dynamic-pressure bearing of this sort are illustrated in FIGS. 10A and 10B.

The spindle motor in FIG. 10A is fit out with a dynamic-pressure bearing device 50, in which a lubricating-fluid taper seal section 53 is formed, in a single location only. The motor's shaft 51 is inserted into a sleeve 52, wherein radial dynamic-pressure bearings 55, 55 support radially directed load on the motor. Mounted on the shaft 51 at its tip is a thrust plate 56 where thrust bearings 58, 58 that bear axially directed load on the motor are formed. The bottom portion of the sleeve 52 is closed off by a thrust bushing 57, wherein the bearing gap extending from the lubricating-fluid boundary surface in the taper seal section 53 to the shaft tip is filled with the lubricating fluid, without any places in which the fluid is interrupted. The open portion of the bearing device, where the bearing gap meets the external air, is in the upper end only, and is where the taper seal section 53 is formed.

A bearing-device structure of this sort is highly reliable in that the surface area of contact between the lubricating fluid and the external air is small, and thus neither the mixing of air bubbles into, nor the gasification of, the lubricating fluid is liable to occur. Nonetheless, in order to inject lubricating fluid into the bearing device, air must be discharged ahead of time from the bearing gap, making equipment for that purpose necessary.

The spindle motor in FIG. 10B is fit out with a dynamic-pressure bearing device 5', in which the open portions of the bearing gap are in two locations, above and below, which puts the taper seal sections 53, 53 in the two locations above and below. Although evaporation of the lubricating fluid in a bearing-device structure of this type proves to be fairly rapid, an advantage to the structure is that the central stationary shaft can be employed, for example, as a support column for supporting a hard-disk housing.

As far as the injection of lubricating fluid into the bearing device is concerned, if for example lubricating fluid is poured into the taper seal section in the upper end, it spreads along by capillary action, heading downward through the successive gap sections, and the air is discharged through the lower end. But the complex bearing-gap conformation means that there will be slight inconsistencies in the gap sections that give rise to differences in how the lubricating fluid spreads, leading to unequal permeation. Consequently, with this structure as well, it is necessary to discharge air ahead of time from the bearing gap.

In the final analysis, as long as a dynamic-pressure bearing device is not especially structured for readily discharging air from its bearing gap, when the device is to be charged with lubricating fluid, it will be necessary to exhaust the bearing gap.

(2) Publicly Known Infusing Methods and Problems Therewith

Methods such as follows are examples of techniques for injecting lubricating fluid into the bearing gap, after air filling the gap has been discharged, in dynamic-pressure bearing devices like device 50 or 5' discussed above.

(2-1) First Method

One is a method in which the bearing device and a container filled with lubricating fluid are put into a vacuum chamber, and with the chamber in an evacuated state, the open portion of the bearing gap is either immersed in lubricating fluid or is submerged within lubricating fluid, after which air is introduced into the vacuum chamber to repressurize it. The air pressure applied in repressurization forces the lubricating fluid soundly into the full depth of the bearing gap.

Although this method may be realized with relatively simple facilities, the lubricating fluid sticks to the outside of the bearing device. Particularly in implementations in which the bearing device is incorporated into a hard disk drive, lubricating fluid having adhered to the outside of the bearing device becomes a cause of fluid contaminating the disk(s). The adhered lubricating fluid therefore must be carefully wiped off, which makes necessary a manufacturing process step that significantly impairs productivity. In implementations in which a screw-hole into which a disk clamp is fastened is provided in the head of the shaft, the lubricating fluid permeates the screw-hole and the thread groove. Removing lubricating fluid that has permeated a narrow area of this sort in the bearing device is extremely difficult.

(2-2) Second Method

An alternative technique is a method in which the bearing device is set inside a vacuum chamber, and with the chamber in an evacuated state a cylindrical capillary tube such as a fine syringe needle is used to trickle lubricating fluid into the open portion, or the taper seal section, of the bearing device, following which the chamber is repressurized.

Employing this method might lead to the expectation that the process step for wiping away lubricating fluid that has stuck to the outer side of the bearing device could be omitted, but in actuality the method does not necessarily work well. This is because when the lubricating fluid is squirted from the needle tip, frequently the fluid froths at the tip and the froth bursts, splattering on and contaminating the outside of the bearing device.

It might then seem that a way to get rid of the frothing would be beforehand to sufficiently clear the lubricating fluid of air that has dissolved into it. In practice, however, frothing occurs even if the lubricating fluid undergoes a degassing process, such that contamination of the bearing device exterior is eliminated only with difficulty.

Furthermore, with the method in which a syringe needle is used, the amount of lubricating fluid that will just fill the bearing gap has to be measured accurately and trickled (or injected) into the gap. With the foregoing first method, because the amount of lubricating fluid required to fill the bearing gap is forced into the bearing device during repressurization, the bearing gap is always left having been filled up with lubricating fluid, so that there is never a shortfall. And since any amount that overflows from the taper seal section 53 is wiped up together with the rest of the lubricating fluid, there is also never a surplus. Advantage cannot be taken of such phenomena and wiping-up work in the case in which lubricating fluid is trickled into the bearing device.

BRIEF SUMMARY OF THE INVENTION

An infusion method of the present invention is characterized in that in dispensing lubricating fluid under reduced pressure into the terminal open portion of a dynamic-pressure bearing gap, the pressure in the vicinity of the dispenser nozzle tip is raised slightly. This pressure advantageously is higher than the pressure when the lubricating fluid undergoes a degassing process.

Infusion methods to date have evacuated the vacuum chamber to lower as far as possible the pressure of the interior, where lubricating-fluid dispensing is carried out. While this may be thought to be the proper course of action, actually it cannot be said to be mandatory for the dispensing of lubricating fluid. The primary reason why the bearing gap has to be evacuated is in order to thwart intrusion into the lubricating fluid of air in the gap. Nevertheless, once the pressure in the bearing gap falls below 1000 Pa, theoretically the pressure of residual gas should lose out to the surface tension of the lubricating fluid, such that the lubricating fluid is able to infiltrate into the bearing gap. For that reason, if the lone objective is simply to infuse lubricating fluid, there is scant need to reduce the pressure below that level.

The reality is that because the interior of the narrow bearing gap is not evacuated easily, nor is the pressure there readily lowered below that at the open portion of the gap, the pressure of the vacuum chamber must be lowered further. And procedural parameters have been selected to lower the chamber pressure as much as possible, since the less the air remaining within the bearing gap, the better prepared for the dispensing job the bearing device will be.

However, once the pressure falls below, for example, 100 Pa, the volume of the remnant air when the chamber is returned to ordinary pressure will decrease to one-thousandth of its volume when the chamber was pumped down. Evacuating the chamber more than that is only nominally effective for reducing residual gas. What is more, at such low pressure, a troublesome phenomenon occurs in which at the tip portion of the capillary tube the supplied lubricating fluid froths, scattering in splashes.

According to research investigations by the present inventors, a frothing phenomenon of this sort arises when the pressure of the vacuum chamber where the fluid-dispensing operation is carried out is lower than the internal pressure of the fluid tank in degas-treating the lubricating fluid. As a result of that understanding, in the present invention the pressure inside the vacuum chamber is raised slightly beyond the pressure during the degassing process. By doing so, frothing is held in check. Charging a dynamic-pressure bearing device with lubricating fluid is possible even if the pressure within the vacuum chamber is raised, as long as the pressure stays under about 1000 Pa, as explained previously.

In an infusion method of the invention that is the subject of the present application, the pressure of the fluid tank interior may be raised to impart pressure to the lubricating fluid, and by means of that pressure the lubricating fluid may be forced out of the tank towards the dynamic-pressure bearing device. Conceivable ways of imparting pressure to the lubricating fluid include a method of situating the fluid tank in a high position to set up pressure originating in the high-to-low differential, but in implementations requiring more forceful pressure the high-to-low differential alone is insufficient. Although gas will end up dissolving into the lubricating fluid when the pressure of the fluid tank interior is heightened, it takes time for the gas to dissolve throughout the lubricating fluid. Counter to this is the fact that the lubricating-fluid dispensing process finishes in matter of seconds. Therefore, after dispensing, elevation in the concentration of gas within the lubricating fluid can be averted by again evacuating the chamber.

In accordance with the present invention, dynamic-pressure bearing devices of the sort illustrated in FIG. 10A, in which the open portion of the bearing gap is in one location only, can be charged with lubricating fluid.

With an infusion method of the present invention, because the dispensing process can be divided into plural cycles, the requisite quantity of lubricating fluid can be infused even in implementations in which the necessary amount of lubricating fluid cannot in one time be dispensed into the open portion of the bearing gap.

In an infusion method of the present invention, after lubricating fluid has been dispensed into the bearing-gap open portion the vacuum chamber interior is raised to a third pressure, thereby making reliable forcing of the lubricating fluid into the depths of the bearing device possible. A further aspect of the present invention is that along with implementing the dispensing step in a plurality of cycles, the pressure elevation step may be implemented in plural cycles as well. In that case, the third pressure has to be a pressure that enables the surface tension of the lubricating fluid to be overcome. The target for that pressure is, as discussed earlier, 1000 Pa.

An inspection method of the present invention checks a dynamic-pressure bearing having been charged with lubricating fluid by a method pertaining to the present invention, to ensure that problems such as overflow of lubricating oil under an environment of the atmospheric pressure in the lower levels of the stratosphere has not occurred. This inspection thus guarantees that troubles will not occur in the bearing device even when shipped by aircraft on international air routes that fly in the lower reaches of the stratosphere.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 2 is schematic views of an dispensing device and a fluid tank;

FIG. 3 is magnified views of key portions of the dispensing device;

FIG. 4 is a diagram for explaining how the lubricating-fluid infusion apparatus operates;

Figure 1:
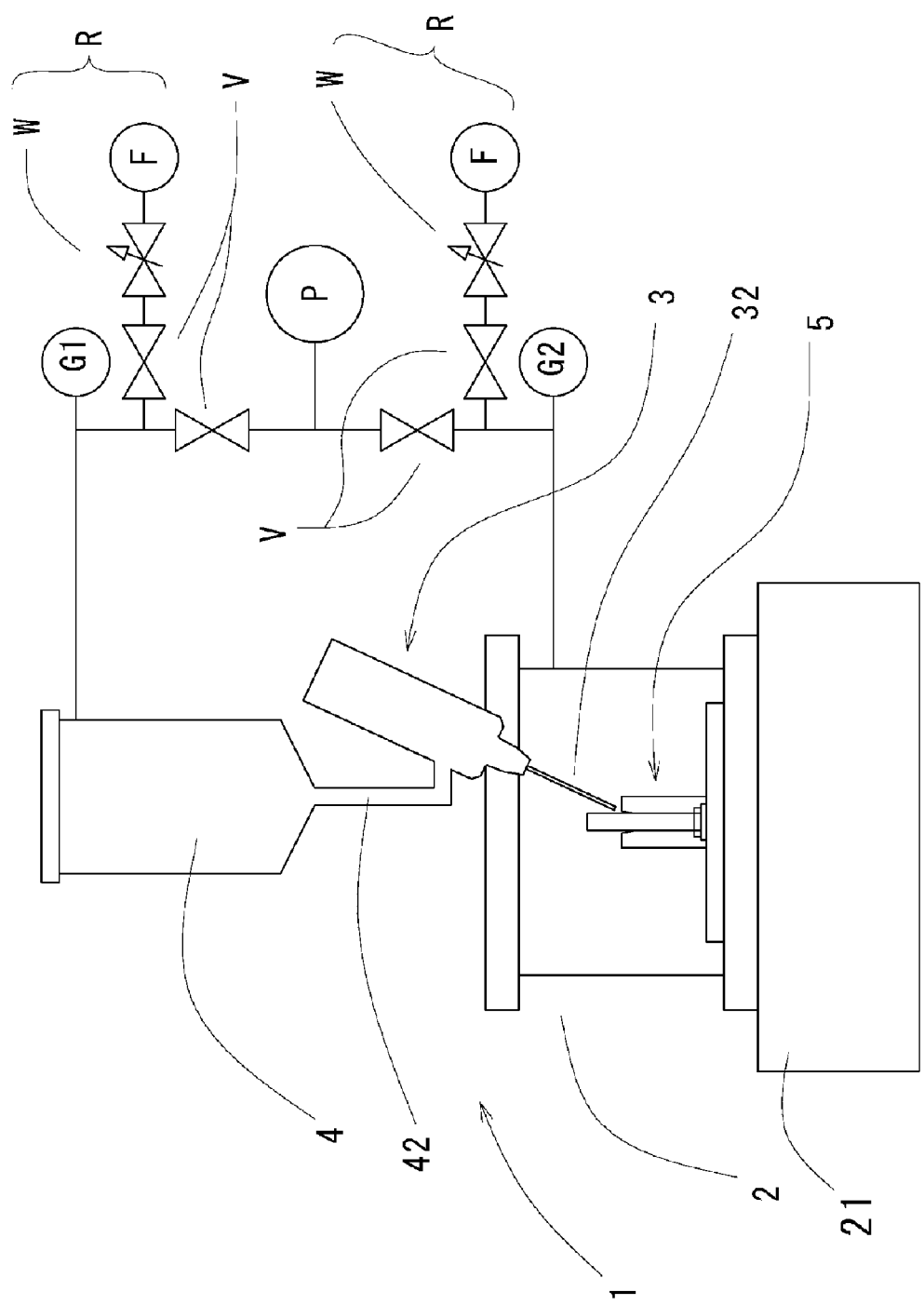
FIG. 1 is a schematic view of a lubricating-fluid infusion apparatus involving the present invention.

DETAILED DESCRIPTION OF THE INVENTION (1) Lubricating-Fluid Infusion Apparatus (1-1) Device Overall Reference is made to FIG. 1, which illustrates a lubricating-fluid infusion apparatus 1 for implementing a lubricating-fluid infusion method involving the present invention. The lubricating-fluid infusion apparatus 1 is made up of a vacuum chamber 2, an dispenser 3, a lubricating fluid tank 4, and, for pumping down the interior of these components, a vacuum pumping device and a gas-introduction mechanism R, as well as their connecting supply lines.

In this implementation, a general rotary pump P is employed as the vacuum pumping device. The gas-introduction mechanism R, comprising a flow control valve W, and a filter F for preventing dust from invading the mechanism, introduces ambient air into the supply lines. To further ensure that invasion of dust is prevented, the flow control valve W adjusted to make it so that the air inflow speed does not grow excessively large. Reference marks G1 and G2 indicate Penning gauges, which enable the internal pressure of the vacuum chamber 2 and fluid tank 4 to be monitored.

The dispenser 3 is made up of a valve mechanism 30 (shown in FIG. 3) and a cylindrical capillary tube 32 mounted in the tip of the valve mechanism. The dispenser 3 is connected to the bottom portion of the fluid tank 4 through a feed duct 42. A dynamic-pressure bearing device 5 is set inside the vacuum chamber 2, and is infused with lubricating fluid supplied through the tip of the capillary tube 32.

The vacuum chamber 2 is of glass manufacture in a lidded cylindrical form that is open-ended along the underside; thus the status within the chamber may be observed from without. As depicted in FIG. 1, the open-ended portion of the chamber along its underside is closed off by a pedestal 21. This occlusion is maintained airtight by means of a not-illustrated O-ring made of rubber. The vacuum chamber 2 is connected to the rotary pump P and the gas-introduction mechanism R via ventilation valves V and W.

FIG. 2 illustrates the fluid tank 4 and the dispenser 3. As depicted in FIG. 2A, an empty space 45 is left in the upper portion of the reservoir 4, and by pumping down this space, the concentration of gas dissolved in the lubricating fluid can be lowered. Relevant to that operation is a conduit 42b connected to this region of the reservoir 4, through which the pressure of the empty space 45 is reduced/elevated. During pump-down, a stirring mechanism is operated to promote the reducing of the concentration of gas dissolved into the lubricating fluid. The stirring mechanism is made up of a rod 44 furnished with a magnet, and a stirrer 43 likewise furnished with a magnet, wherein rotating the rod 44 rotates the stirrer 43 in the interior of the fluid tank 4. The fluid tank 4 interior is joined to the dispenser 3 via the feed duct 42, and in turn is joined to the exterior through the capillary tube 32 mounted in the tip of the dispenser 3.

In order to dispense lubricating fluid into the dynamic-pressure bearing device, a sufficiently large, stabilized ejection pressure must be attendant on the lubricating fluid sent into the dispenser 3. Otherwise, the fluid-dispensing volume will vary with each dispensing operation, which is prohibitive of assuring uniform product quality, especially in cases in which bearing devices are mass-produced.

For that purpose, in the FIG. 2A instance, ejection pressure is imparted to the lubricating fluid by introducing air at atmospheric pressure into the empty space 45. Meanwhile, represented in FIG. 2B is a different method, in which ejection pressure is imparted to lubricating fluid stored within a cylinder 46 by placing a plummet 48 onto a plunger 47 fitted into the cylinder 46. An advantage to the FIG. 2B method is that pressure may be imparted to the lubricating fluid without exposing it to air. However, because the lubricating fluid once having been fed into the fluid tank 4 can no longer be degassed, the fluid must be adjusted ahead of time to adequately reduce the concentration of gas dissolved in the fluid. Which of these two methods to choose is best decided by the technician taking other factors into consideration.

(1-2) Valve Mechanism

As will be detailed later, in the lubricating-fluid infusion apparatus 1, with the interior of the fluid tank 4 in a reduced-pressure state in order to degas the lubricating fluid, the capillary tube 32 tip is in a situation in which it is exposed to atmospheric pressure. Under those circumstances, external air tries to enter in, heading toward the fluid tank 4. Conversely, when the infusion apparatus 1 dispenses lubricating fluid, on the one hand the tip of the capillary tube 32 is under reduced pressure; on the other, the empty space 45 is put at atmospheric pressure, imparting dispensing pressure to the lubricating-fluid. Under these circumstances, the lubricating fluid tries to flow out, heading toward the exterior. In either case, the flow has to be stopped with the valve mechanism. Consequently, what is sought in a valve mechanism for the dispenser 3 is that the valve will not give rise to leaking not only when the internal pressure is in a higher state, but also when the external pressure is. A valve mechanism 30 of the structure illustrated in FIG. 3 can be employed as such a valve.

The description now turns to FIG. 3, a sectional view illustrating key features of the dispenser 3. From the end portion of the cylindrical capillary tube 32, mounted in the tip of the dispenser 3, fluid is dispensed into the dynamic-pressure bearing device. Joined to the fluid tank 4 via the feed duct 42 is an inlet 34 through which lubricating fluid imparted with delivery pressure is supplied. In a supply hole 35 formed in a valve base part 31, an occluding rod 33 is accommodated for being pressed back and forth by a drive mechanism 38. When the occluding rod 33 is pressed downward in the figure by the drive mechanism 38, it closes off an occlusion hole 37, forming a shutoff (FIG. 3A). Conversely, when the rod is drawn upward in the figure, the occlusion hole 37 is cleared, permitting the passage of lubricating fluid (FIG. 3B). The drive mechanism 38 can be a device having the lone capability of simply shifting the occluding rod 33 back and forth, and can be constituted from, for example, a spring and an electromagnet. The occluding rod 33 can thus be driven at high speed merely by electrical on/off switching.

In a valve mechanism 30 configured in this way, the occlusion established by the occluding rod 33 and the occlusion hole 37 is located extremely close to the basal end of the capillary tube 32 (nozzle); moreover, forward of the shutoff, there is no surplus cavity in which air bubbles and the like would get stuck. The lubricating-fluid flowpath in the dispenser 30 running forward of the occlusion is constituted almost exclusively by the cavity in the interior of the cylindrical capillary tube 32.

(2) Infusion Procedure (2-1) Infusion Process

Initially the vacuum chamber 2 is lifted up into its opened state as indicated in FIG. 4A, and the dynamic-pressure bearing device 5 is set in a predetermined position atop the pedestal 21. To heighten the accuracy with which the bearing device is located into place, a special jig or a precision-movable stage may be employed.

In this state, the inside of the vacuum chamber 2 is at atmospheric pressure whereas the empty space 45 in the fluid tank 4 is continuously evacuated, wherein the space is pumped down to a pressure of 10 Pa (first pressure). At the same time, by the magnet-equipped rod 44 rotating, the stirrer 43 plunged into the fluid tank 4 interior rotates, thus stirring the lubricating fluid. Gastightness between the fluid tank 4 and the vacuum chamber 2 is maintained by the dispenser 3. With the lubricating fluid being exposed to an atmosphere of 10 Pa in pressure, the evacuation and stirring are continued. Under such conditions, the concentration of gas present dissolved within the lubricating fluid may be deemed to be at a concentration about in equilibrium with that of the atmosphere of 10 Pa in pressure.

Next the vacuum chamber 2 is lowered to close off its open-ended side against the pedestal 21, and the interior is pumped down. The dispenser 3 and the fluid tank 4 are lowered together with the vacuum chamber 2, shifting to a low position. As a result, the tip of the capillary tube 32 is positioned into the seal section 53 (FIG. 5) formed in the open portion of the bearing gap of the dynamic-pressure bearing device 5. At the same time, as a result of the fluid tank 4 having shifted downward, the change in relative position of the rod 44 brings its magnetic force out of action, and thus the stirrer 43 stops rotating, halting the stirring action.

Then the evacuation level for the vacuum chamber 2 is adjusted (pressure-adjusting step) so that the internal pressure of the vacuum chamber 2 will go to a pressure (second pressure) somewhat higher than the first pressure.

After that, in order to impart delivery pressure to the lubricating fluid, ambient air is introduced into the empty space 45, raising it to atmospheric pressure. Ambient air is advantageous as the most readily available source for supplying constant pressure. Nevertheless, the space 45 does not necessarily have to be brought to atmospheric pressure, but according to requirements may equally well be brought beneath atmospheric or above atmospheric pressure, freely selected using a suitable device.

Next, the valve mechanism 30 is opened for a predetermined duration to deliver the proper quantity of lubricating fluid that the dynamic-pressure bearing device 5 is meant to retain. At that time, although the lubricating fluid in the fluid tank 4 interior will have been exposed to air at atmospheric pressure, because the stirring will have been stopped, in particular the lubricating fluid being drawn out from the lower portion of the fluid tank 4 will have been in a state of approximate equilibrium with the first pressure.

The lubricating fluid being ejected flows out from the tip of the capillary tube 32. At that point, lubricating fluid flowing out from the tip of the capillary tube 32 will not froth, because the internal pressure of the vacuum chamber 2 will have gone to 30 Pa (second pressure), which is greater than the first pressure. Therefore, the process of wiping up lubricating fluid having splattered due to frothing and become stuck to the dynamic-pressure bearing device can be omitted. What is more, the elimination of loss due to frothing reduces dispensing volume variation, making the dispensing volume more accurate.

It should be noted that in advance of the pressure-adjusting step, the interior of the vacuum chamber 2 may if necessary be momentarily pumped down to a pressure (fifth pressure) lower than the second pressure. For example, the chamber interior may be pumped down to the same 10-Pa level as the first pressure. Doing so makes evacuation of the bearing even more thorough. Prior to fluid dispensing, however, the chamber must be pressurized to a pressure (second pressure) higher than the first pressure to prevent the fluid from frothing.

(2-2) Status of Seal Section

Figure 5:
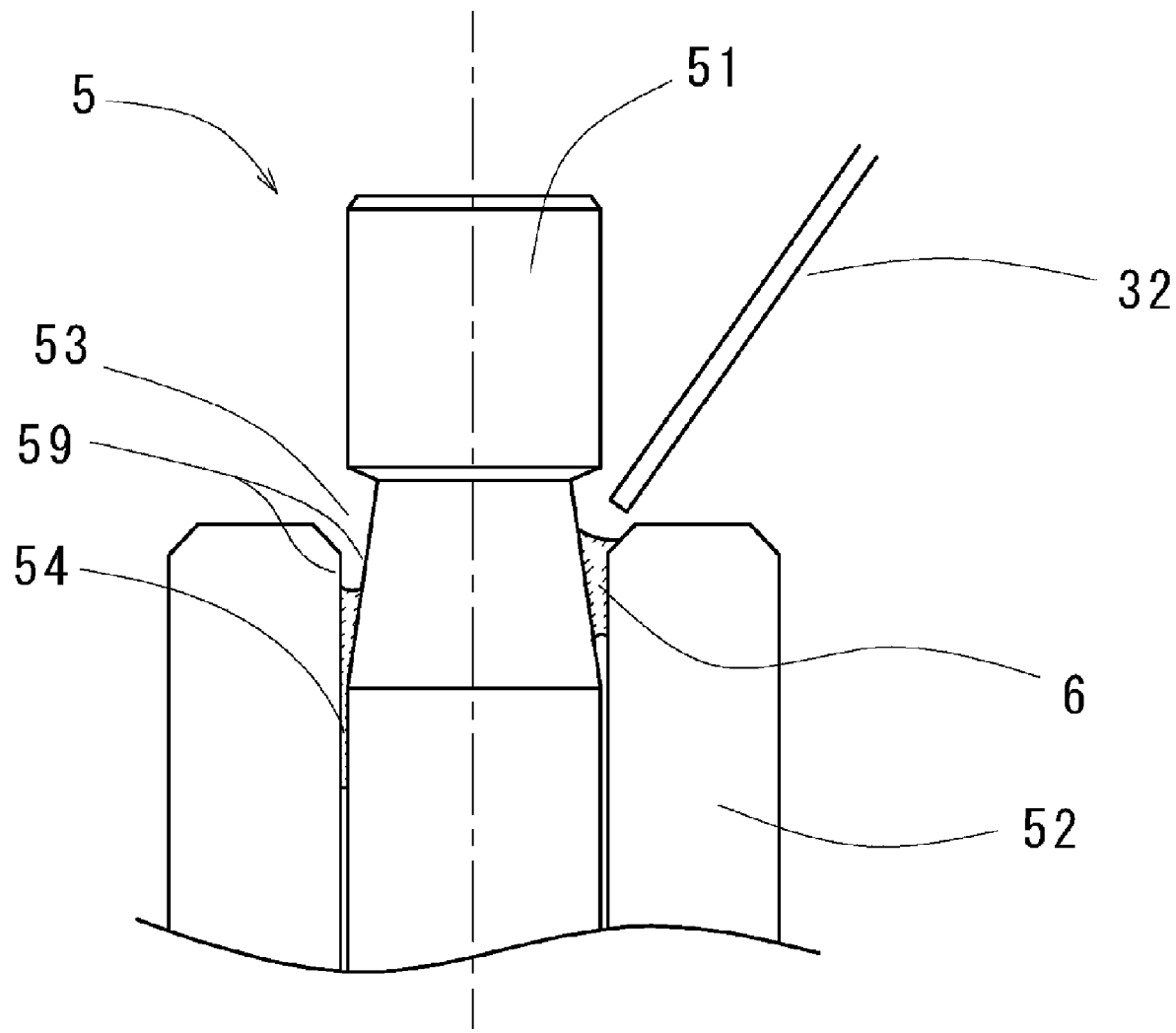
FIG. 5 is an enlarged view of the seal section of a dynamic-pressure bearing device.

FIG. 5 represents an enlarged view of the vicinity of the seal section 53 of the dynamic-pressure bearing device 5 right after having been infused with fluid.

The seal 53 is formed in the open end of the bearing gap—marked with reference numeral 54 in the figure—in between the shaft 51 and the sleeve 52. The tip of the cylindrical capillary tube 32 is drawn near the seal 53, to just short of touching its wall surfaces, in which state the lubricating fluid is dispensed. The shaft 51 constitutes a bearing-device rotary component, and the sleeve 52 constitutes a bearing-device stationary component. With the seal section 53 being formed in the open portion of the bearing gap, it surrounds the rotary component.

Lubricating fluid having been dispensed spreads around the entire the seal section due to its affinity for the seal-section wall surfaces, but does not reach the depths of the bearing gap 54. At this stage the lubricating fluid—marked with reference numeral 6 in FIG. 5—need not fill the seal section in its entirety, but must occupy the entire circuit of seal area of the gap. Moreover, by the bearing-device environs having been pumped down to 30 Pa beforehand, the bearing gap will have been pumped down to a pressure near that, and thus the lubricating fluid will be in a state in which due to its affinity for the wall surfaces it will readily enter into the depths of the bearing gap. The right-hand side of FIG. 5 schematically represents the immediate post-dispensing state of the fluid. Immediately post-dispensing the lubricating fluid 6 pools in the open portion of the bearing device, but by its affinity for the wall surfaces the fluid transitions at once into the state sketched on the left-hand side of the figure. In the figure left-hand side, the lubricating fluid has in part crept into the depths of the bearing gap 54, lowering the liquid surface of the lubricating fluid in the seal section 53 by that extent.

Depending on the configuration of the seal section 53, and on the quantity of lubricating fluid that the bearing is meant to hold, in some cases the requisite amount of lubricating fluid cannot be dispensed in a one-time operation. In such cases, the fluid dispensing job may be divided into two or more cycles. The second and subsequent fluid-dispensing operations then can be carried out by estimating the time, following the first-cycle fluid-dispensing job, for the lubricating fluid to spread around the entire seal section 53 and its liquid surface to drop sufficiently.

After the fluid dispensing operation is finished, the vacuum chamber 2 interior is repressurized (third pressure). The repressurization develops a pressure differential between the lubricating fluid 6 interior/exterior, forcing the lubricating fluid 6 into the depths of the bearing gap 54 and completing the lubricating-fluid dispensing job. Although it is easiest to repressurize back to atmospheric pressure, repressurization to a pressure lower than atmospheric will not impede the dispensing process, as long as the pressure is sufficient to force the lubricating fluid all the way into the bearing gap. In addition, the vacuum chamber 2 may again be evacuated and the fluid dispensing process carried out again, once lubricating fluid has been forced into the gap and sufficient space in the seal section 53 has been secured.

Figure 6:
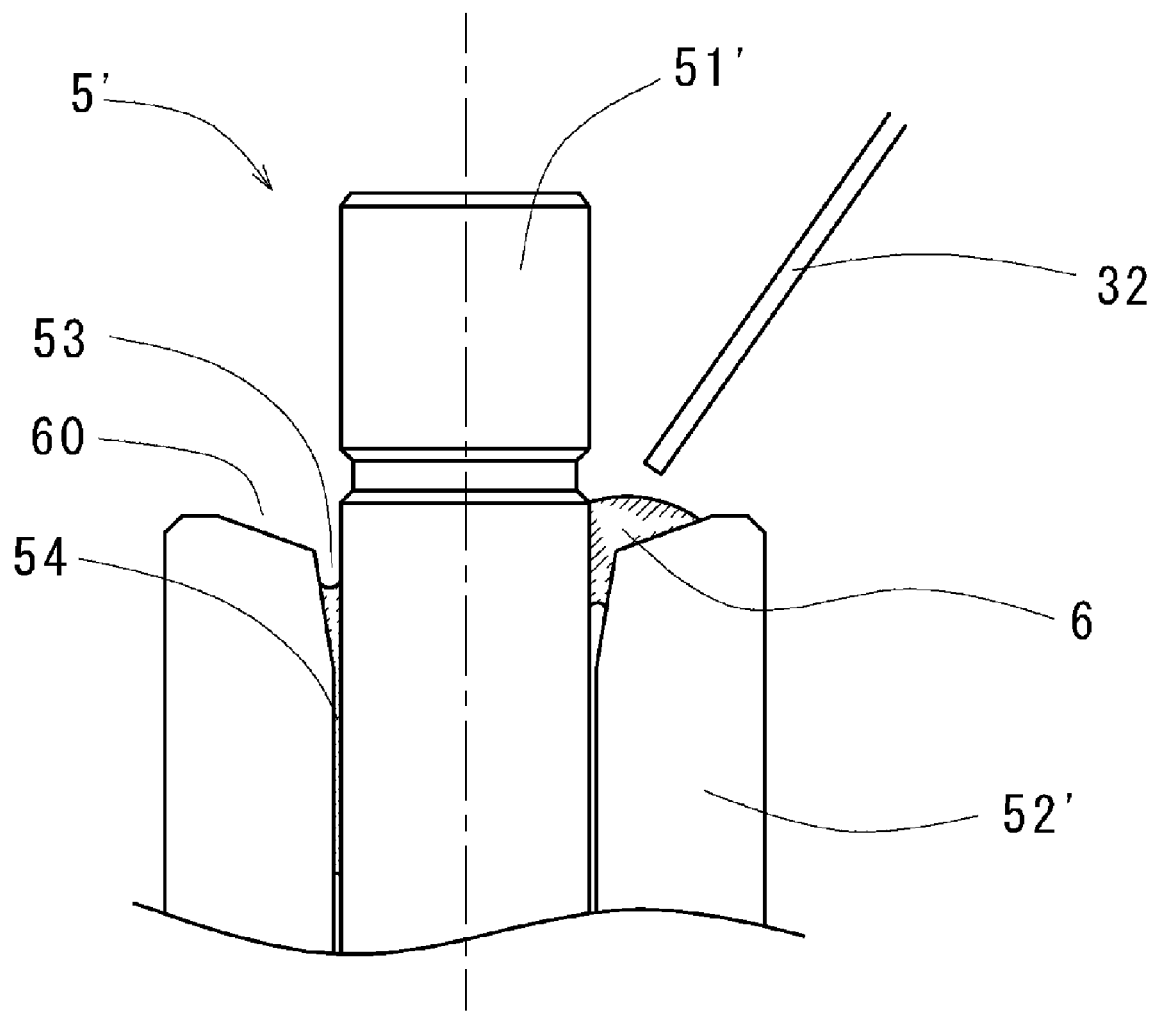
FIG. 6 is a second view of a dynamic-pressure bearing device seal section.

Reference is now made to FIG. 6, which, like FIG. 5, is an enlarged view of a bearing-device seal section, in this case in a dynamic-pressure bearing device 5' in which the upper-end face of the sleeve has a slope 60. A fluid-repellent film is formed on the slope and shaft surfaces. In implementations in which the dynamic-pressure bearing device is structured in this way, the dispensed lubricating fluid fills over the slope (right half of the figure), and by capillary action subsequently permeates its way into the bearing gap (left half of the figure). Benefits of having the slope 60 are not only that a large volume of lubricating fluid may be dispensed at once, but also that lubricating fluid does not get left behind on the upper-end face of the sleeve.

(2-3) Encroached Air Check

The dynamic-pressure bearing device 5 on which the dispensing procedure has been finished is then run through a procedure to check for the presence of air encroachment. Although the reliability of the bearing-device infusion method of present invention is extraordinarily high, foul dispensings can arise nevertheless. Thus, inspection for excluding such rejects is carried out.

Figure 7:
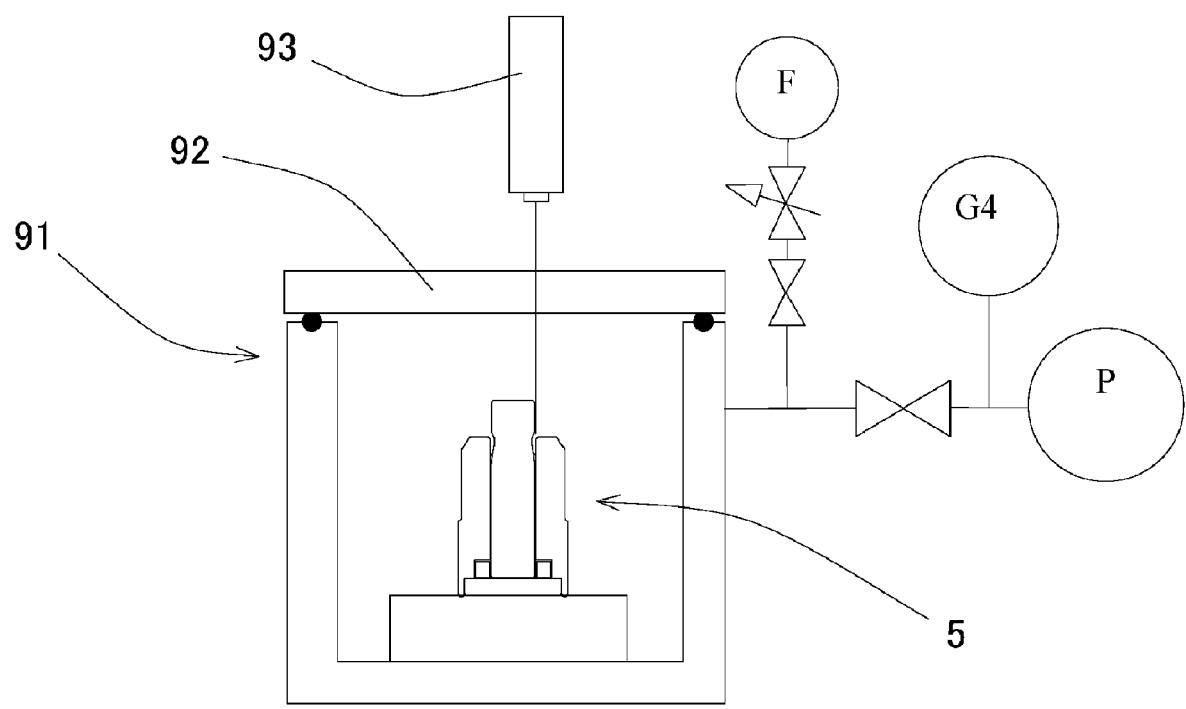
FIG. 7 is a diagram for explaining a procedure to check for air encroachment.

FIG. 7 is a diagram for explaining this procedure. The dispensing-processed bearing device 5 is put under atmospheric pressure. As far as the pressure environment for this procedure is concerned, as long as the pressure is higher than a later-described fourth pressure, inspection is in principle possible, but atmospheric pressure, being quite readily realized, is advantageous.

The dynamic-pressure bearing device 5 is set inside a vacuum case 91 furnished with an evacuation mechanism, and anchored using a suitable jig. In that situation, the level of the lubricating fluid in a state in which atmospheric pressure has been applied is measured. The measurement is made using a laser displacement sensor 93, whose beam passes through a glass lid 92 on the vacuum case 91.

Next a vacuum pump P and a venting valve are operated to lower the internal pressure of the vacuum case 91 to 1000 Pa, which is the fourth pressure. In this state, the fluid level is once again measured, and is compared with the level before the pressure was reduced. If upon this second measurement the amount by which the level has risen exceeds a predetermined value, the device is excluded as a reject; if not, the device is rendered an acceptable item.

When the dynamic-pressure bearing device is shipped by airfreight, the aircraft will fly in the lower regions of the stratosphere, which at maximum elevation is in the neighborhood of 14 km into the sky. At that elevation the atmospheric pressure is on the order of 140 hPa, which is considerably larger than 1000 Pa (10 hPa). Consequently, if a dynamic-pressure bearing device has passed the reduced-pressure test at 1000 Pa, then even if the device is transported in a cargo bay that is not pressurized in the least, the likelihood of fluid leakage occurring may be deemed to be extremely small.

(2-4) Preprocess Lubricating-Fluid Degassing and Feeding into the Infusion Apparatus The lubricating fluid that is fed into the lubricating-fluid infusion apparatus 1 is subjected to a special degassing process in advance, which shortens the time required for the degassing process within the fluid tank 4. In an infusion method of the present invention, lubricating fluid that is insufficiently degassed because the interior of the fluid tank 4 is repeatedly exposed to the air may be deaerated with greater assurance in a separate vacuum chamber initially.

Figure 8:
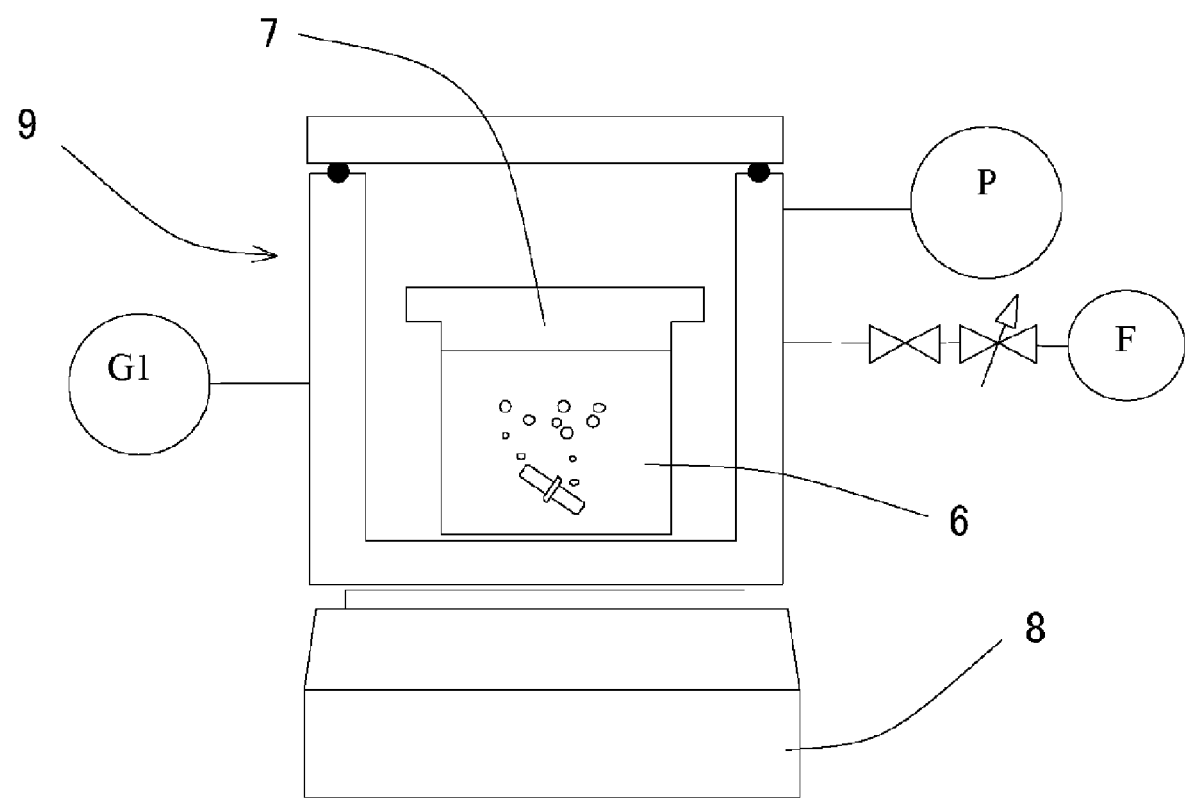
FIG. 8 is a diagram for explaining a lubricating-fluid degassing procedure.

FIG. 8 illustrates the configuration of a degassing device utilized for such objectives. A vacuum case 9 is placed atop a magnetic-stirrer drive mechanism 8, and within a lubricating-fluid reservoir 7 inside the case 9 lubricating fluid 6 is contained.

The vacuum case 9 interior is pumped down by a vacuum pump P to a pressure lower than the first pressure. A good target is pumping down to 10 Pa or less to keep on evacuating the case further. Long-term stirring in that state is continued, reducing dissolved gas until the level at which it is in equilibrium with this pressure ambient.

Figure 9:
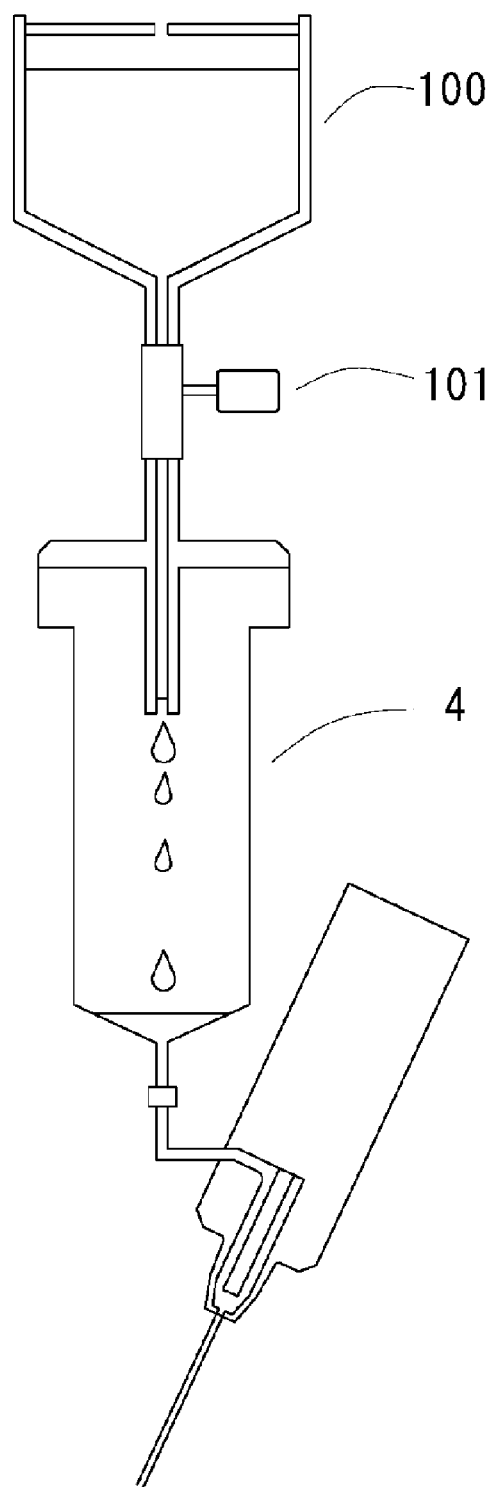
FIG. 9 is a diagram for explaining a procedure to trickle-feed lubricating fluid into the fluid tank.
Figure 10A:
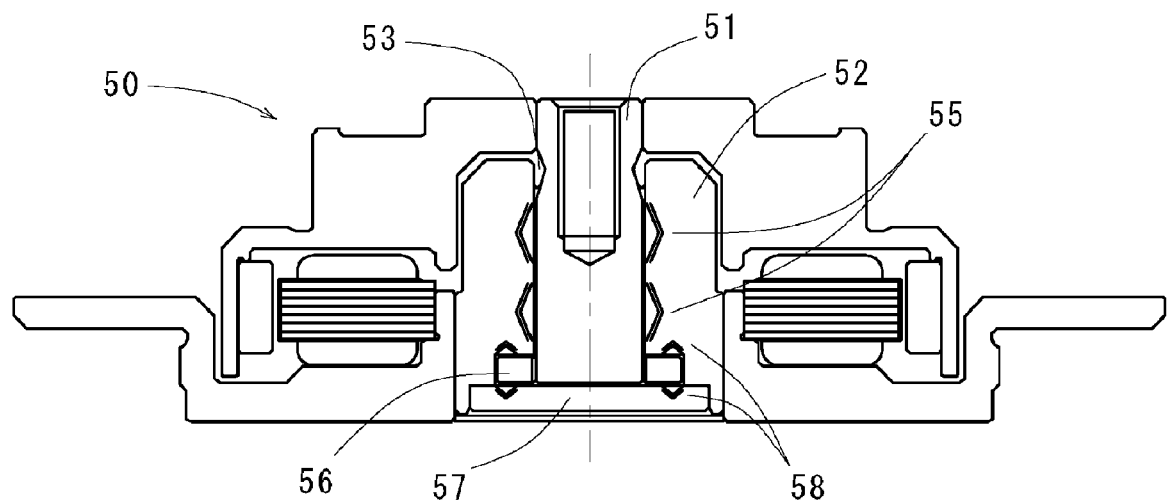
FIG. 10 is views of spindle motors fit out with fluid dynamic-pressure bearings.
Figure 10B:
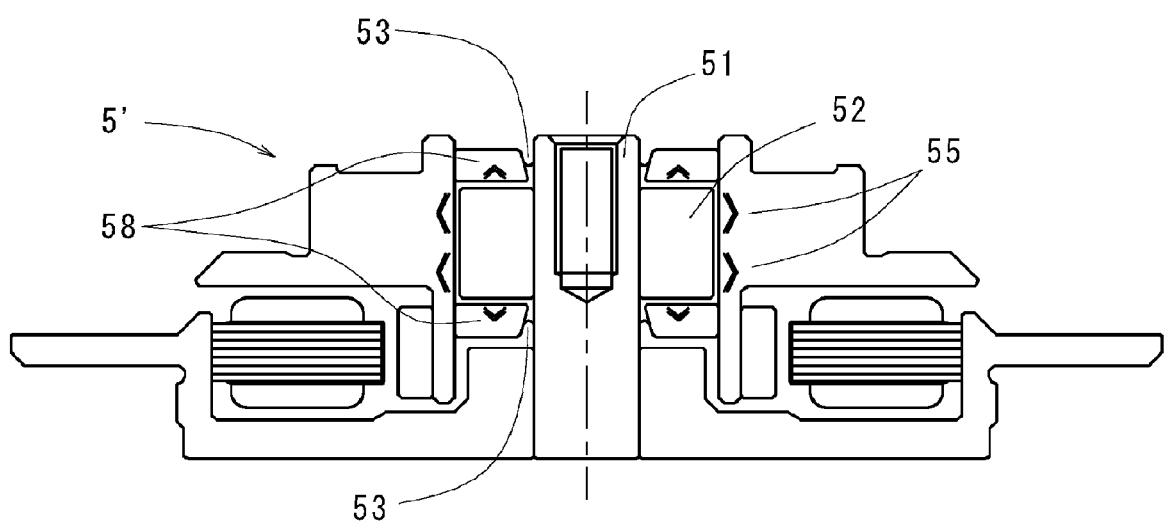

In addition to the advance degassing process, means may be devised so as to produce a deaerating effect when the lubricating fluid is fed into the fluid tank 4. FIG. 9 represents a method of trickle feeding lubricating fluid into the fluid tank 4.

Specifically, the lubricating fluid is fed into a funnel 100, and via a microflow valve 101 is trickled in drops into the fluid tank 4. The fluid tank 4 interior is pumped down to 10 Pa or so. With the surface area per unit volume of the drops being large, degassing proceeds rapidly. And degassing is promoted further by the drops undergoing shock when they strike the inner surface of the fluid tank and the liquid surface.

Not-illustrated heaters are attached to the vacuum case 9 and the fluid tank 4 utilized for the preprocess degassing. The lubricating fluid is deaerated having been heated up by the heaters to 60 degrees. Degassing proceeds swiftly because in general the solubility of gasses in a liquid drops as the temperature of the liquid rises.

The best mode, explained in the foregoing, for embodying the present invention is not limited by the content set forth herein. For example, as the dynamic-pressure bearing device into which lubricating fluid is dispensed, a shaft-rotating type has been depicted, but the effects of the present invention when applied to a shaft-stationary type of dynamic-pressure bearing device do not alter. As a lubricating-fluid stirring mechanism, an example that employs a magnetic stirrer has been illustrated, but rotating the stirrer by utilizing a terminal or other device that introduces rotation into the vacuum chamber yields similar effects.

What is claimed is:

1. For a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting the surrounding external air, a method of charging the dynamic-pressure bearing device with lubricating fluid, by using a nozzle directed on, to deliver the lubricating fluid to, the open portion of the bearing device, the method comprising:

a degassing step of reducing the concentration of gas present dissolved in the lubricating fluid to a first concentration being the concentration at which the dissolved gas is approximately at equilibrium with respect to a gaseous atmosphere of a predetermined first pressure;

a pressure-adjusting step of putting the atmosphere at the bearing-device open portion at a second pressure higher than the first pressure and lower than atmospheric pressure; and under the atmosphere having been realized by said pressure-adjusting step, a fluid-dispensing step of streaming lubricating fluid having been through said degassing step, into the bearing-device open portion using the nozzle.

2. For a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting the surrounding external air, a method of charging the dynamic-pressure bearing device with lubricating fluid, by using a nozzle directed on, to deliver the lubricating fluid to, the open portion of the bearing device, the method comprising:
 a pressure-adjusting step of putting the atmosphere at the bearing-gap open portion at a second pressure; and
 under the atmosphere having been realized by said pressure-adjusting step, a fluid-dispensing step of streaming lubricating fluid at a first concentration, being a concentration lower than the concentration of lubricating-fluid dissolved gas when in equilibrium with the second pressure, into the bearing-gap open portion using the nozzle.

3. A lubricating-fluid infusion method as set forth in claim 1, wherein in said degassing step, the lubricating fluid is exposed to an atmosphere at the first pressure.

4. For a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting the surrounding external air, a method of charging the dynamic-pressure bearing device with lubricating fluid, by using a nozzle directed on, to deliver the lubricating fluid to, the open portion of the bearing device, the method comprising:
 for a lubricating-fluid tank having an internal space kept gastight against the exterior, a stocking step of storing into the internal space a volume of lubricating fluid smaller than the volume of the internal space in the lubricating-fluid tank;
 a degassing step of evacuating, to bring the hollow remaining inside the lubricating-fluid tank to a first pressure and expose the lubricating fluid to the atmosphere at the first pressure;
 a pressure-adjusting step of putting the atmosphere at the bearing-gap open portion at a second pressure higher than the first pressure and lower than atmospheric pressure; and
 under the atmosphere having been realized by said pressure-adjusting step, a fluid-dispensing step of raising the pressure of the hollow to a pressure higher than the second pressure, to impart delivery pressure to the lubricating fluid, and streaming lubricating fluid into the bearing-gap open portion through the nozzle, wherein the nozzle communicates with the region where the lubricating fluid inside the lubricating-fluid tank is stored.

5. A lubricating-fluid infusion method as set forth in claim 1, wherein the dynamic-pressure bearing device has only a single open portion alone, and the bearing gap communicates with the external air through the open portion alone.

6. A lubricating-fluid infusion method as set forth in claim 2, wherein the dynamic-pressure bearing device has only a single open portion alone, and the bearing gap communicates with the external air through the open portion alone.

7. A lubricating-fluid infusion method as set forth in claim 3, wherein the dynamic-pressure bearing device has only a single open portion alone, and the bearing gap communicates with the external air through the open portion alone.

8. A lubricating-fluid infusion method as set forth in claim 4, wherein the dynamic-pressure bearing device has only a single open portion alone, and the bearing gap communicates with the external air through the open portion alone.

9. The lubricating-fluid infusion method as set forth in claim 5, wherein:
 said fluid-dispensing step is executed either in one cycle, or in a plurality of cycles separated by predetermined intervals; and
 the gross amount of lubricating fluid streamed from the nozzle by said fluid-dispensing step either in one cycle or a plurality of cycles is approximately equal to the appropriate amount of lubricating fluid that the bearing device is meant to hold.

10. The lubricating-fluid infusion method as set forth in claim 6, wherein:
 said fluid-dispensing step is executed either in one cycle, or in a plurality of cycles separated by predetermined intervals; and
 the gross amount of lubricating fluid streamed from the nozzle by said fluid-dispensing step either in one cycle or a plurality of cycles is approximately equal to the appropriate amount of lubricating fluid that the bearing device is meant to hold.

11. The lubricating-fluid infusion method as set forth in claim 7, wherein:
 said fluid-dispensing step is executed either in one cycle, or in a plurality of cycles separated by predetermined intervals; and
 the gross amount of lubricating fluid streamed from the nozzle by said fluid-dispensing step either in one cycle or a plurality of cycles is approximately equal to the appropriate amount of lubricating fluid that the bearing device is meant to hold.

12. The lubricating-fluid infusion method as set forth in claim 8, wherein:
 said fluid-dispensing step is executed either in one cycle, or in a plurality of cycles separated by predetermined intervals; and
 the gross amount of lubricating fluid streamed from the nozzle by said fluid-dispensing step either in one cycle or a plurality of cycles is approximately equal to the appropriate amount of lubricating fluid that the bearing device is meant to hold.

13. The lubricating-fluid infusion method as set forth in claim 9, further comprising a repressurization step, following at least a one-cycle implementation of said fluid-dispensing step, of elevating the pressure of the atmosphere at the bearing-gap open portion to a third pressure higher than the second pressure.

14. The lubricating-fluid infusion method as set forth in claim 10, further comprising a repressurization step, following at least a one-cycle implementation of said fluid-dispensing step, of elevating the pressure of the atmosphere at the bearing-gap open portion to a third pressure higher than the second pressure.

15. The lubricating-fluid infusion method as set forth in claim 11, further comprising a repressurization step, following at least a one-cycle implementation of said fluid-dispensing step, of elevating the pressure of the atmosphere at the bearing-gap open portion to a third pressure higher than the second pressure.

16. The lubricating-fluid infusion method as set forth in claim 12, further comprising a repressurization step, following at least a one-cycle implementation of said fluid-dispensing step, of elevating the pressure of the atmosphere at the bearing-gap open portion to a third pressure higher than the second pressure.

17. A method of inspecting a dynamic-pressure bearing device that has been charged with lubricating fluid by the lubricating-fluid infusion method as set forth in claim 5, the bearing-device inspection method comprising steps of:
putting the bearing device into a first testing state in which the atmosphere at the bearing-gap open portion is under an environment in which the pressure is greater than the atmospheric pressure in the lower levels of the stratosphere;
with the bearing device in the first testing state, measuring the level of the interface of the infused lubricating fluid and letting the measurement be a first interface height;
putting the bearing device into a second testing state by adjusting the atmosphere at the bearing-gap open portion so as to be a fourth pressure that is the atmospheric pressure in the lower levels of the stratosphere, or else a pressure below that, yet greater than the second pressure;
with the bearing device in the second testing state measuring the level of the interface of the infused lubricating fluid and letting the measurement be a second interface height; and
if the difference between the second interface height and the first interface height is a predetermined value or greater, excluding the dynamic-pressure bearing device as a reject, and if the difference is less than the predetermined value, rendering the device an acceptable item.

18. A method of inspecting a dynamic-pressure bearing device that has been charged with lubricating fluid by the lubricating-fluid infusion method as set forth in claim 6, the bearing-device inspection method comprising steps of:
putting the bearing device into a first testing state in which the atmosphere at the bearing-gap open portion is under an environment in which the pressure is greater than the atmospheric pressure in the lower levels of the stratosphere;
with the bearing device in the first testing state, measuring the level of the interface of the infused lubricating fluid and letting the measurement be a first interface height;
putting the bearing device into a second testing state by adjusting the atmosphere at the bearing-gap open portion so as to be a fourth pressure that is the atmospheric pressure in the lower levels of the stratosphere, or else a pressure below that, yet greater than the second pressure;
with the bearing device in the second testing state measuring the level of the interface of the infused lubricating fluid and letting the measurement be a second interface height; and
if the difference between the second interface height and the first interface height is a predetermined value or greater, excluding the dynamic-pressure bearing device as a reject, and if the difference is less than the predetermined value, rendering the device an acceptable item.

19. A method of inspecting a dynamic-pressure bearing device that has been charged with lubricating fluid by the lubricating-fluid infusion method as set forth in claim 7, the bearing-device inspection method comprising steps of:
putting the bearing device into a first testing state in which the atmosphere at the bearing-gap open portion is under an environment in which the pressure is greater than the atmospheric pressure in the lower levels of the stratosphere;
with the bearing device in the first testing state, measuring the level of the interface of the infused lubricating fluid and letting the measurement be a first interface height;
putting the bearing device into a second testing state by adjusting the atmosphere at the bearing-gap open portion so as to be a fourth pressure that is the atmospheric pressure in the lower levels of the stratosphere, or else a pressure below that, yet greater than the second pressure;
with the bearing device in the second testing state measuring the level of the interface of the infused lubricating fluid and letting the measurement be a second interface height; and
if the difference between the second interface height and the first interface height is a predetermined value or greater, excluding the dynamic-pressure bearing device as a reject, and if the difference is less than the predetermined value, rendering the device an acceptable item.

20. A method of inspecting a dynamic-pressure bearing device that has been charged with lubricating fluid by the lubricating-fluid infusion method as set forth in claim 8, the bearing-device inspection method comprising steps of:
putting the bearing device into a first testing state in which the atmosphere at the bearing-gap open portion is under an environment in which the pressure is greater than the atmospheric pressure in the lower levels of the stratosphere;
with the bearing device in the first testing state, measuring the level of the interface of the infused lubricating fluid and letting the measurement be a first interface height;
putting the bearing device into a second testing state by adjusting the atmosphere at the bearing-gap open portion so as to be a fourth pressure that is the atmospheric pressure in the lower levels of the stratosphere, or else a pressure below that, yet greater than the second pressure;
with the bearing device in the second testing state measuring the level of the interface of the infused lubricating fluid and letting the measurement be a second interface height; and
if the difference between the second interface height and the first interface height is a predetermined value or greater, excluding the dynamic-pressure bearing device as a reject, and if the difference is less than the predetermined value, rendering the device an acceptable item.

* * * * *